N. L. MERRICK.
ENVELOP FASTENER.
APPLICATION FILED FEB. 28, 1907.
922,934.
Patented May 25, 1909.
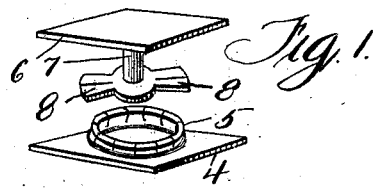
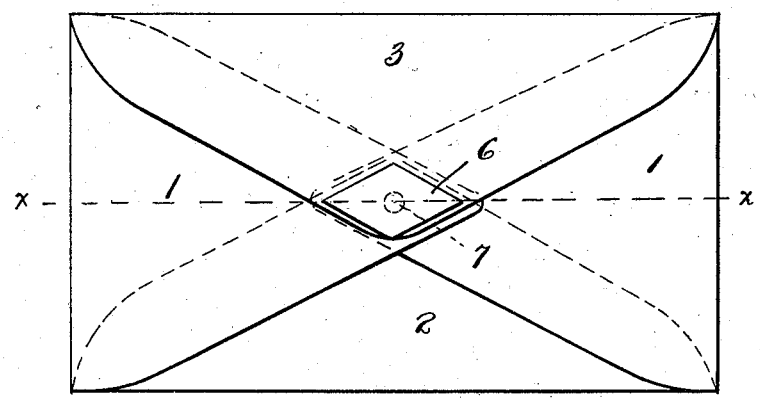
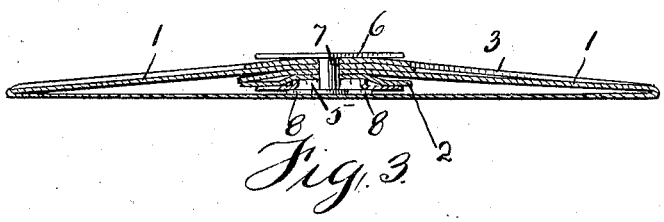
WITNESSES:
INVENTOR
Nellie L. Merrick
BY
Attorneys

UNITED STATES PATENT OFFICE.

NELLIE L. MERRICK, OF ALLEGHENY, PENNSYLVANIA.

ENVELOP-FASTENER.

No. 922,934.　　　　Specification of Letters Patent.　　　Patented May 25, 1909.

Application filed February 28, 1907. Serial No. 359,842.

*To all whom it may concern:*

Be it known that I, NELLIE L. MERRICK, a citizen of the United States of America, residing at Allegheny, in the county of Allegheny and State of Pennsylvania, have invented certain new and useful Improvements in Envelop-Fasteners, of which the following is a specification, reference being had therein to the accompanying drawing.

This invention relates to envelop fasteners, and its primary object is to provide an envelop with novel means for securing the flap to the back in such a manner as to render it impossible to open the envelop without defacing the flap, and thus showing that the envelop has been tampered with.

A further object of the invention is to provide a securing device for the sealing flap which will also serve to connect the end flaps to the back of the envelop.

The construction of the improvement will be fully described hereinafter in connection with the accompanying drawing which forms a part of this specification, and its novel features will be defined in the appended claim.

In the drawing:—Figure 1, is a view in perspective of the two parts of the fastening device separated from each other. Fig. 2, is a rear elevation of an envelop with the fastener applied thereto, and, Fig. 3, is a section on the line x—x of Fig. 2.

The envelop is of the usual construction consisting of a body or front provided with end flaps 1, a bottom flap 2, and a sealing flap 3.

The fastener comprises a socket plate 4 provided with a central opening surmounted by a vertically extending slitted collar or flange 5 adapted to be inserted through openings formed in the bottom flap and end flaps of the envelop. The fastener further comprises a clasp consisting of a plate 6, a stud or shank 7 depending centrally from the lower face of the plate, and a disk 7ª carried on the lower end of the shank and formed integral with a pair of resilient arms 8 which extend at right angles with respect to the shank.

The collar or flange 5 may be of any suitable shape, but preferably is shown circular. The arms 8 are constructed of resilient sheet metal, the slits in said arms adding to their flexibility.

The socket plate 4 is secured to the inner surfaces of the end flaps by a suitable adhesive and the collar or flange 5 extends as before stated through openings formed in the bottom and end flaps. The sealing flap 3 is also provided with an opening through which extends the shank 7 of the clasp. To connect the two parts of the fastener together the resilient slitted arms are forced through the central opening in the socket plate, said arms contracting owing to their resiliency during the passage through the socket plate. When the arms 8 are entirely through the plate 4, they are released and project outwardly at right angles with respect to the shank 7 and so as to engage the inner surface of the plate 4. Such position of the arms 8 will securely lock the two parts of the clasp together and prevent the removing of the sealing flap without mutilating it. It will be understood that the flaps are gummed in the usual way, and that the fastening is supplemental to the sealing of the gummed flap 3.

Having fully described my invention, what I claim and desire to secure by Letters Patent is:—

A fastener for envelops comprising a socket plate formed with a central opening, and further having a vertically extending slitted flange formed on the upper face thereof, said flange surrounding said opening, a flat clasp plate having a shank depending centrally from the lower face thereof, a disk carried on the lower end of said shank, and a pair of normally flat resilient slitted arms formed integral with said disk and extending at opposite directions with respect to each other, said arms normally extending at right angles with respect to said shank and adapted to be forced through said flange and opening and engaging the lower face of the socket plate to connect said socket plate and clasp plate together.

In testimony whereof I affix my signature in the presence of two witnesses.

NELLIE L. MERRICK.

Witnesses:
　MAX H. SROLOVITZ,
　A. J. TRIGG.